United States Patent [19]
Jacobsthal

[11] 4,376,278
[45] Mar. 8, 1983

[54] APPARATUS AND METHOD FOR COLLISION AVOIDANCE

[75] Inventor: Herbert K. Jacobsthal, Scottsdale, Ariz.

[73] Assignee: Honeywell Information Systems Inc., Phoenix, Ariz.

[21] Appl. No.: 219,149

[22] Filed: Dec. 22, 1980

[51] Int. Cl.³ .............................................. H04Q 1/24
[52] U.S. Cl. .................................. 340/825.5; 370/13; 371/22
[58] Field of Search ......................... 340/825.5; 178/3; 370/85, 13; 371/22, 27; 179/175.2 R; 375/10; 455/67

[56] References Cited

U.S. PATENT DOCUMENTS

| | | | |
|---|---|---|---|
| 4,063,220 | 12/1977 | Metcalfe . | |
| 4,099,024 | 7/1978 | Boggs . | |
| 4,138,599 | 2/1979 | Munter ................................ | 370/13 |
| 4,197,500 | 4/1980 | Klein et al. .......................... | 455/67 |
| 4,259,663 | 3/1981 | Gable et al. ....................... | 340/825.5 |
| 4,271,523 | 6/1981 | Gable et al. ....................... | 340/825.5 |
| 4,282,512 | 8/1981 | Boggs et al. ...................... | 340/825.5 |
| 4,345,250 | 8/1982 | Jacobsthal ........................ | 340/825.5 |

OTHER PUBLICATIONS

Kleinrock, "Performance of Distributed Multi-Access Computer Communication System," 1977, 547,552.

Primary Examiner—Donald J. Yusko
Attorney, Agent, or Firm—Arthur A. Sapelli; W. W. Holloway, Jr.; L. J. Marhoefer

[57] ABSTRACT

A collision avoidance apparatus having a voltage source producing a predetermined voltage level. A switching network within the collision avoidance apparatus is capable of alternately applying the predetermined voltage level to the communication medium and of applying the voltage level of the communication medium to a logic network. The logic network indicates if the predetermined voltage level and the voltage level of the communication medium are approximately equal.

21 Claims, 3 Drawing Figures

APPARATUS AND METHOD FOR COLLISION AVOIDANCE

BACKGROUND OF THE INVENTION

1. Field of the Invention

The invention relates to an apparatus for information communication systems having a communication medium and, more particularly, this invention relates to an apparatus for information communication systems which allows avoidance of collisions of information signals within a communication medium.

2. Description of the Prior Art

An example of an anti-collision device for an information communication system (sometimes referred to as an inter-system-link) is shown in U.S. Pat. No. 4,063,220 issued to Metcalfe et al on Dec. 13, 1977 and entitled "Multi Point Data Communication System With Collision Detection" and U.S. Pat. No. 4,099,024 issued to Boggs et al on July 4, 1978 and entitled "Communications Network Repeater". The system shown in the Metcalfe and Boggs patents utilizes a plurality of repeaters to aid in reducing the possibility of undetected collisions by reducing attenuation. The Metcalfe and Boggs patents show collision detection by utilizing a device which determines when a collision has actually occurred by measuring phase shift in the information signal received.

A further discussion of detecting and avoiding collisions within information communication systems is shown in an article by Kleinrock entitled "Performance of Distributed Multi-Access Computer Communication Systems" published in the 1977 IFIP Congress Proceedings at page 587. The methods described include the one discussed above in connection with the Metcalfe and Boggs patent. Another method described is to utilize a time slot during which each device connected to the information communication system is authorized to transmit. Another method is to have a central controller send a request to each device connected to the information communication system to determine if it has information which it desires to transmit. A further method is to divide the information communication system over the frequency spectrum and provide each device on the information communication system with a different bandwidth for transmission purposes. Another method described in the article is to have each receiver connected to each device on the information communication system determine if any carrier is detected on the link. The Kleinrock article generally discusses the various problems with the eight schemes discussed therein (some of the schemes are combinations of the various other schemes), which Kleinrock refers to as the unavoidable price.

The basic problem is that one transmitter may begin to transmit without realizing that another transmitter is transmitting because the communication medium attenuates the information signal transmitted and causes propagation delays for the information signals transmitted therethrough.

None of the prior constructions or methods of collision avoidance utilize a device which provides a predetermined voltage level DC to the communication medium (coaxial cable) of the information communication system, examines the DC voltage level of the communication medium, and compares that voltage level with the predetermined D.C. voltage level provided to the communication medium.

SUMMARY OF THE INVENTION

In accordance with the present invention, a voltage source, having a known output, supplies, through a resistor ladder network and operational amplifier, a predetermined D.C. voltage level to a reference node. The reference node is connected through a switching network selectively to a communication medium. The switching network can also selectively apply the voltage level of the communication medium to a communication node. A comparator within a logic network is connected to the communication node and the reference node. The comparator signals when there is a difference between the two voltage levels. The logic network provides a signal indicating when the voltage levels are equal to a counter. The counter advances its count by one count each time the logic network is indicating that the voltages are unequal. The count within the counter is supplied to a frequency synthesizer which responds to the count by varying the frequency of the digital pulse stream it produces. The higher the count the slower the frequency produced by the frequency synthesizer. The frequency synthesizer receives a priority signal and the system clock from the controller to provide the base, along with the count from the counter, from which it generates its digital pulse stream at its output. The frequency of the digital pulse stream produced by the frequency synthesizer decreases as the priority signal increases. The digital pulse stream from the synthesizer is provided at the count input of a divider which indicates when a certain number of consecutive pulses within a digital pulse stream are received. The indication from the divider comprises a restart signal which is provided to the controller. The controller provides control signals to the switching network, the counter, and frequency synthesizer for selectively applying the predetermined D.C. voltage level to the communication medium and the voltage level of the communication medium to a communication node. The controller allows the counter, to advance by one count, when the predetermined D.C. voltage level at the reference node medium and the voltage level of the communication node are not approximately equal. If the D.C. voltage levels of the communication node and the reference node are approximately equal, this indicates that the communication medium is clear. The controller, if the communication medium is clear and the information can be sent on the communication medium, is capable of clearing the counter and resetting it to its initial count. The controller also receives the count which indicates that a fault exists when a predetermined count is exceeded.

DESCRIPTION OF THE PREFERRED EMBODIMENT

Figure 1:
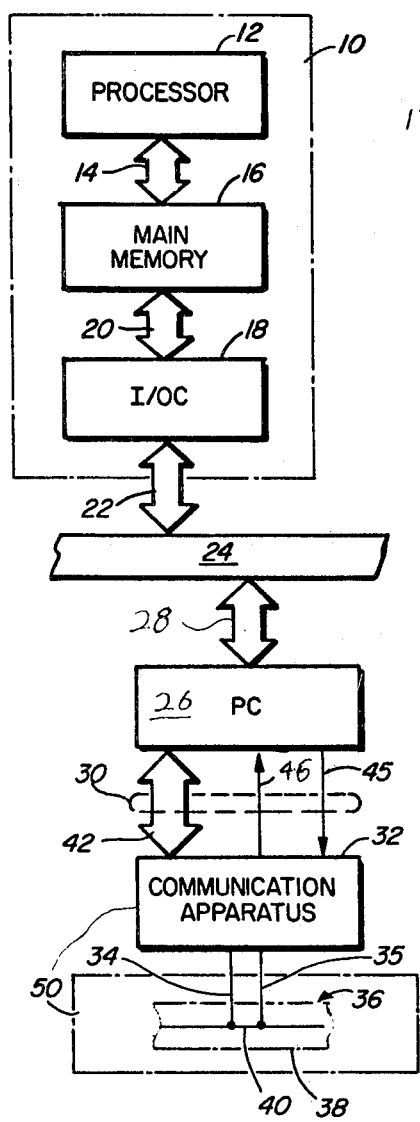
FIG. 1 is a block diagram of a device connected to an information communication system utilizing the present invention.

With reference to the drawings and in particular to FIG. 1 thereof, a data processing system 10 has a processor 12 connected through a multi-line channel 14 to a main memory 16. Main memory 16 of data processing system 10 is connected to an input/output controller 18 (shown in the drawings as I/OC) through multi-line channel 20. Input/output controller 18 is connected through multi-line channel 22 to a bus 24. Bus 24 can be connected to a plurality of apparatus including the peripheral controller 26 through multi-line channel 28. The peripheral controller 26 is in turn connected through a multi-line channel 30 to a communications apparatus 32. The communication apparatus 32 is connected through lines 32 and 35 to a communication medium 36. Lines 34 and 35 can be combined to form a single line if desired. The communication medium 36 includes a shield 38 and a conductor 40 which forms a coaxial cable.

The processor 12 communicates with the main memory 16 to request information stored in the main memory and to store information thereinto. The main memory under control of the processor is capable of receiving and transferring information to the input/output controller 18. The input/output controller 18 can communicate through bus 24 to the peripheral controller 26. Peripheral controller 26 is capable among other functions of transferring information to and obtaining information from communication apparatus 32. Channel 30 between peripheral controller 26 and communication apparatus 32 includes a multi-line channel 42 and lines 45 and 46. The peripheral controller is capable through multi-line channel 42 of receiving and transferring information and control signals to communication apparatus 32. Communication apparatus 32 is capable of transferring information and status signals to communication medium 36 and receiving information and control signals therefrom through line 34. Communication medium 36, line 34, line 35 and their connection to communication medium 36 along with the other connections and lines to other communication apparatus (not shown) comprise an information communication system 50.

Figure 2:
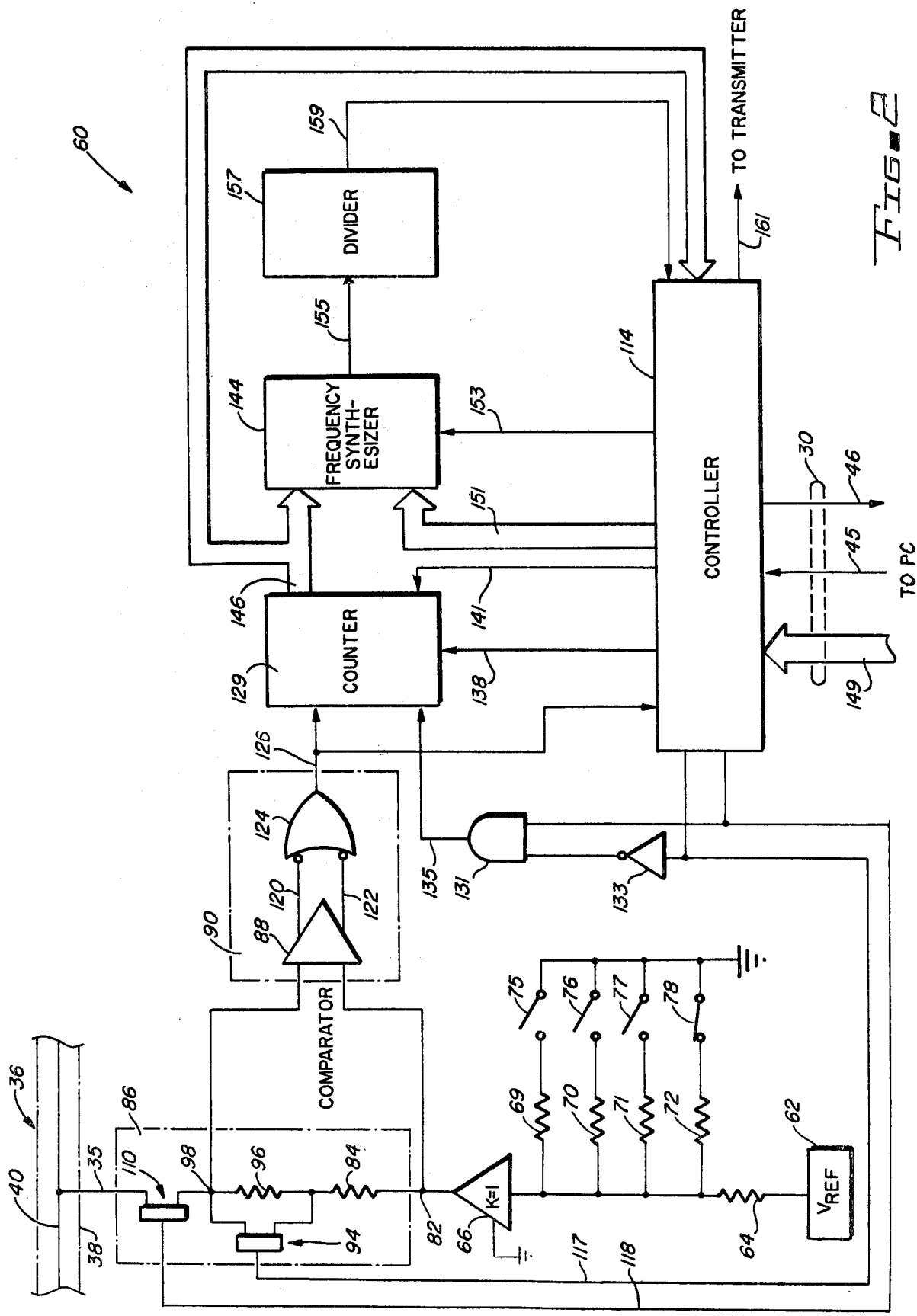
FIG. 2 is a block diagram of collision avoidance apparatus.

A collision avoidance apparatus 60 is shown in FIG. 2. Collision avoidance apparatus 60 is a portion of the communication apparatus 32 of FIG. 1. The communication apparatus 32 is discussed in more detail in the copending U.S. Patent Applications by Jacobsthal, Ser. Nos. 219,150 now U.S. Pat. No. 4,345,250, 219,407, and 219,148 filed on the same date herewith and entitled: "Information Communication System With Collision Avoidance"; "Apparatus and Method for Encoding Information"; and "Apparatus and Method for Decoding Information" which are incorporated by reference hereinto. A voltage reference source 62 produces a known voltage level. The output of reference source 62 is applied through resistor 64 as the input to an operational amplifier 66. Operational amplifier 66 has a gain of 1. Thus, whatever voltage is applied as its input becomes its output and its purpose within the apparatus 60 is to act as a current driver and sink. Resistors 69 through 72 are also connected to the input of operational amplifier 66. Each of resistors 69 through 72 is connected through a switch 75 through 78, respectively, to ground. The resistors 69 through 72 and the corresponding switches 75 through 78 form a binary ladder network which is capable of being switched to provide a certain known predetermined voltage level as the input to operational amplifier 66. The selection and the purpose of the binary ladder network is described in more detail in the copending applications incorporated above. It should be noted however that if desired a single resistor of the proper value can be substituted for resistors 69 through 72 as long as the predetermined voltage level is applied as an input to operational amplifier 66. Each collision avoidance apparatus (similar to collision avoidance apparatus 60) within the other communication apparatus (only communication apparatus 32 is shown in FIG. 1) connected to communication medium 36 has a different unique predetermined D.C. voltage level.

The output of operational amplifier 66 is connected to a reference node 82. Reference node 82 is also connected to resistor 84 within a switching network 86, and as an input to a comparator 88 within a logic network 90. Resistor 84 is connected at its end away from its connection to reference node 82 to a switch 94 and one end of a resistor 96. The other end of resistor 96 away from its connection to resistor 84 is connected to the other opposite side of switch 94. Thus, when switch 94 is closed, resistor 96 is effectively shorted. The end of resistor 96 away from its connection to resistor 84 is also connected to a communication node 98. Communication node 98 is also connected as an input to comparator 88 and to one side of a switch 110. The other side of switch 110 is connected through line 35 to conductor 40 of communication medium 36. Switches 94 and 110 are similar and can be any type of switch suitable for the purpose, for example, MOSFET switches.

When switches 94 or 110 are actuated they effectively provide a closed circuit and when deactuated they provide effectively an open circuit to the flow of electricity. Switches 94 and 110 are actuated and deactuated by a controller 114 through lines 117 and 118, respectively. Lines 117 and 118 are connected to the gates of the switches 94 and 110. When an appropriate voltage is provided by controller 114 through either line 117 or 118 the associated switch 94 or 110 is actuated and it effectively provides a short circuit through the switch.

When controller 114 actuates both switch 94 through line 117 and switch 110 through line 118, operational amplifier 66 is almost directly coupled to conductor 40. Operational amplifier 66 then attempts to bring conductor 40 to the predetermined voltage level. Resistor 84 acts as a current limiting resistor.

In a very short time period conductor 40 can have the same DC voltage level present thereon as provided at the output of operational amplifier 66 unless another collision avoidance apparatus applies its predetermined voltage level (which is unique and different from that of collision avoidance apparatus 60) to conductor 40. The only delay in charging conductor 40 is the capacitance characteristics of the communication medium 36 which is ordinarily a coaxial cable.

Controller 114 after a time period opens switch 94. The voltage level of the communication medium and more particularly that of conductor 40 is applied through the closed circuit of switch 110 to communication node 98, and through communication node 98 to one input of comparator 88. The other side of comparator 88 is connected to the predetermined voltage level present on reference node 82. The purpose of resistor 96 is to offset the DC resistance of the cable and, therefore, should exceed the cable resistance by an order of magnitude of two. By comparison to resistor 96 the resistive value of resistor 84 is relatively small. Switch 110, switch 94, and resistors 84 and 96 comprise the switching network 86.

The comparator 88 of logic network 90 compares the voltage levels it receives from reference node 82 and communication node 98 and responds thereto by supplying a high signal through line 120 if the voltage level on node 98 is higher than the voltage level present on node 82. Comparator 88 supplies a high signal to line 122 if the voltage level on node 98 is less than the voltage level present on node 82. Lines 120 and 122 are connected as inputs to a NOR gate 124. The output of NOR gate 124 goes high if, and only if, the signals on lines 120 and 122 are both low. This condition occurs only when the voltage level inputs from nodes 82 and 98 to comparator 88 are approximately equal. NOR gate 124 and comparator 88 comprise the logic network 90. Thus, logic network 90 through its output from NOR gate 124 indicate when the voltage levels on nodes 98 and 82 are approximately equal.

The output of NOR gate 124 is applied through line 126 as an input to a counter 129 and controller 114. Line 118 is connected as an input to an AND gate 131. Line 117 is connected as an input to AND gate 131 through an inverter 133. The output of AND gate 131 is connected through line 135 to an enable input of counter 129. Line 126 is also connected to an enable input of counter 129. Counter 129 is so adapted that it will not count unless the input received from line 126 is low and its input received from AND gate 131 is high. If counter 129 is supplied with only one enable input when various logic devices can be interfaced between lines 135 and 126 to provide the necessary logic so that counter 129 is enabled only when the output of logic network 90 is low and the controller 114 actuates switch 110 and deactuates switch 94.

If the output of NOR gate 124 to line 126 goes high (which is an indication signal), controller 114 responds by providing a reset signal through line 138 to counter 129. Counter 129 responds to the reset signal on line 138 by providing as its output its initial count. If counter 129 is counting up the counter will normally be reset to a value of 0. If the output of NOR gate 124 to line 126 is low after switch 110 is actuated and switch 94 is deactuated, controller 114 provides a low to high transition to the count input of counter 129 through line 141. This low to high transition causes counter 129 to advance its count by one count. If the counter 129 is counting up it would advance from its current count to the next integer, for example, from 7 to 8.

The output of counter 129 which consists of the current count stored therein is provided to controller 114 and a frequency synthesizer 144 through a multiline channel 146. Controller 114 responds to the count of counter 129 by providing a fault indication to the peripheral controller 26 through line 149 of channel 30 if the count exceeds a predetermined count. The peripheral controller 26 indicates to controller 114 through channel 149 when it has information to be transmitted by communication apparatus 32 on communication medium 36. The count can be a relatively large one indicating that several attempts have been made to send information. This process is discussed in more detail in connection with the flow diagram of FIG. 3.

Controller 114 receives the system clock from the peripheral controller through line 45. The controller 114 also receives a priority signal, which indicates the priority of the information to be sent through multiline channel 149 of channel 30. Controller 114 stores the priority signal and applies it to frequency synthesizer 144 through multiline channel 151. Controller 114 also supplies the system clock it receives on line 45 to the frequency synthesizer through line 153. The frequency synthesizer 144 is adapted to modify the frequency of the digital pulse stream it generates and outputs to line 155 as determined by the frequency of the system clock on line 153 by varying the frequency thereof in response to the count of counter 129 and the priority signal on channel 151. The higher the count within counter 129, which indicates how many times an attempt has been made to send this information and the lower the priority of the information on line 151, the lower the frequency of the digital pulse stream produced by the frequency synthesizer 144 to line 155 becomes. The digital pulse stream produced by frequency synthesizer 144 is connected through line 155 to a divider 157. Divider 157 can be, for example, a counter with line 155 connected to the count input thereof and the carry output thereof connected to controller 114 through line 159. The purpose of divider 157 is to provide a restart signal to line 159 after a certain number of predetermined consecutive pulses are received by divider 157 from synthesizer 144. Controller 114 responds to the restart signal on line 159 by closing switches 94 and 110 and the operation of the collision avoidance apparatus 60 continues as discussed above.

It should be noted that, when the output of NOR gate 124 is high, while the switch 110 is closed and switch 94 is open, controller 114 supplies a signal through line 161 to the transmitter within communication apparatus 32 (FIG. 1) and through channel 149 to peripheral controller 26 indicating that the communication medium 36 is clear and no other information is being transmitted thereon. Peripheral controller 26 responds to the indication that communication medium 26 is clear by transferring the information to be transmitted to communication apparatus 32. Controller 114 at the same time as it sends the indication that communication the indication that communication medium 36 is clear opens switch 110. This allows the transmitter within communication apparatus 32 to send the information received from peripheral controller 26.

If the output of NOR gate 124 is low, while switch 110 is closed and switch 94 is open, controller 114 opens switch 110 when the counter 129 advances by one count. The switches 94 and 110 are not closed again until a restart signal is received from divider 157. Of course, counter 129 advances its count only if a collision would occur if the transmitter within communication apparatus 32 attempted to transmit.

Figure 3:
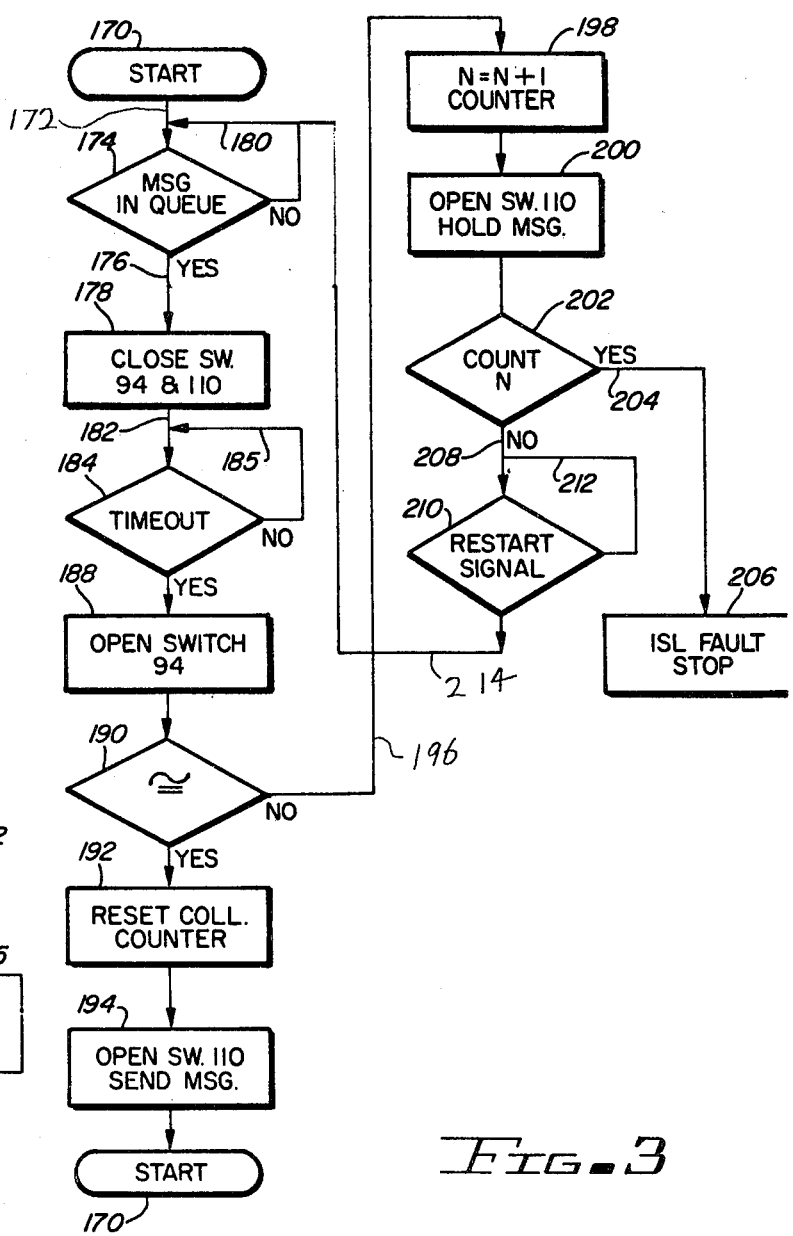
FIG. 3 is a functional flow diagram of the collision avoidance apparatus shown in FIG. 2.

The operation of the collision avoidance apparatus 60 is more fully described in connection with the flow diagram of FIG. 3. The logic begins at logic node 170 and continues through logic path 172 and enters logic stae 174. If controller 114 (FIG. 2) receives an indication through channel 149 that information is ready to be sent, the logic proceeds through path 176 and enters into logic step 178. If information is not ready to be sent while the logic is in logic state 174, the logic recycles through path 180 and re-enters logic state 174.

In step 178 controller 114 causes switches 94 and 110 (FIG. 2) to close. The logic then proceeds through path 182 and enters into logic state 184. In logic state 184 a test is made to determine if sufficient time has passed to ensure that it is possible for conductor 40 to be at the predetermined voltage level. The time period should equal at least twice the propagation delay to the furthest end of the communication medium. If the time period has not elapsed the logic cycles through path 185 and re-enters logic state 184. After the timer period has elapsed the logic proceeds from logic state 184 and enters into step 188. In step 188 controller 114 opens switch 94. The logic then proceeds and enters into logic state 190. In state 190 controller 114 examines the signal it receives on line 126 to determine if the predetermined voltage level is approximately equal to the voltage level of the communication medium, i.e., conductor 40. If the voltage levels are approximately equal, the logic proceeds from state 190 and enters into step 192. In step 192 controller 114 issues a signal through line 138 to reset counter 129. The logic proceeds from step 192 and enters into step 194. In step 194 switch 110 is opened and controller 114 issues a signal through line 161 to the transmitter within communication apparatus 32 (FIG. 1) and to the peripheral controller 26 through channel 149 to commence transmission of the information. The logic then proceeds from step 194 and re-enters logic node 170 and the logic proceeds as discussed above.

If, while the logic is in state 190, the voltage level of conductor 40 and the predetermined voltage level are not approximately equal, the logic proceeds through path 196 and enters into step 198. In step 198 controller 114 issues a low to high transition on line 141 which causes counter 129 to advance by one count. The logic then proceeds and enters into step 200. In step 200 switch 110 is opened by controller 114. It should be noted that by not giving the indication that the communication medium is clear on line 161 and channel 149, the information is held by the peripheral controller and not transmitted. The logic then proceeds from step 200 and enters into logic state 202.

In state 202 controller 114 examines the count it receives from counter 129 through channel 146 to determine if the count has exceeded some certain preselected number. If the count has exceeded some certain preselected number the logic proceeds from state 202 through path 204 and enters into step 206. In step 206 controller 114 issues a fault indication on line 46 and the logic stops. If the count has not exceeded the certain preselected count, the logic proceeds through path 208 and enters into state 210. In state 210 controller 114 examines line 159 to determine if a restart signal has been received from divider 157. If the restart signal has not been received, the logic recycles through path 212 and re-enters state 210. While the logic is in state 210 and if the controller 114 receives a restart signal on line 159, the logic proceeds through path 214 and enters into state 174. The logic then proceeds as discussed above.

Whereas the present invention has been described in particular relation to the drawings attached hereto, it should be understood that other and further modifications, apart from those shown or suggested herein, may be made within the spirit and scope of this invention.

What is claimed is:

1. A collision avoidance apparatus for an information communication system having a communication medium capable of receiving and transferring information provided thereto, comprising:
   a. a voltage source producing a predetermined voltage level at an output thereof;
   b. a switching network connected intermediate said output of said voltage source and said communication medium for selectively providing said predetermined voltage level to said communication medium and the voltage level of said communication medium at an output thereof; and
   c. a logic network operatively connected to said output of said switching network and to said output of said voltage source for indicating when the voltage level of said communication medium and said predetermined voltage level are substantially similar.

2. A collision avoidance apparatus as set forth in claim 1 including a counter operatively connected to respond to said logic network by advancing one count when said logic network fails to indicate similarity.

3. Collision avoidance apparatus as set forth in claim 2 wherein said counter counts up.

4. Collision avoidance apparatus as set forth in claim 2 including a controller connected to actuate said switching network for selectively providing said predetermined voltage level and the voltage level of said communication medium, said controller connected to said counter for determining when the count thereof advances beyond a preselected count, said controller connected to said logic network for responding thereto when said logic network indicates that the voltage level of said communication medium and said predetermined voltage level are similar by resetting said counter to its initial count.

5. Collision avoidance apparatus as set forth in claim 4 including a frequency synthesizer operatively connected to receive the count from said counter and a priority signal from said controller for producing a digital pulse stream having a frequency which varies proportionally with the count of said counter and with said priority signal.

6. Collision avoidance apparatus as set forth in claim 5 including a divider connected to receive said digital pulse stream for producing a restart signal after a certain number of consecutive pulses within said digital pulse stream are received.

7. Collision avoidance apparatus as set forth in claim 6 wherein said controller responds to said restart signal by actuating said switching network to selectively provide said predetermined voltage level and the voltage level of said communication medium.

8. Collision avoidance apparatus as set forth in claim 6 wherein a communication apparatus responds to an indication from said controller, when said logic network indicates that the voltage level of said communication medium and said predetermined voltage level are similar, by transmitting information provided thereto.

9. A collision avoidance apparatus for an information communication system having a communication medium capable of receiving and transferring information provided thereto, comprising:
   a. a switching network connected to a reference node to receive a predetermined voltage level therefrom and to said communication medium for selectively providing said predetermined voltage level to said communication medium and then the voltage level of said communication medium at a communication node; and
   b. a logic network operatively connected to said reference node and to said communication node for indicating when said predetermined voltage level and the voltage level of said communication medium are approximately equal.

10. Collision avoidance apparatus as set forth in claim 9 wherein said switching network provides said predetermined voltage level to said communication medium for a time period at least twice the propagation delay to the furthest end thereof.

11. Collision avoidance apparatus as set forth in claim 9 including a counter in electrical communication with said logic network to count failures of said logic network to indicate that said predetermined voltage level and the voltage level of said communication medium are equal.

12. Collision avoidance apparatus as set forth in claim 11 including a frequency synthesizer responding to the count of said counter by varying the frequency of its digital pulse stream.

13. Collision avoidance apparatus as set forth in claim 12 including a divider connected to receive said digital pulse stream for producing a restart signal after a certain number of consecutive pulses within said digital pulse stream are received.

14. A collision avoidance apparatus for an information communication system having a communication medium capable of receiving and transferring information, comprising:
   a. a first means providing a predetermined voltage level at an output thereof;
   b. a second means connected intermediate said output of said first means and said communication medium for selectively providing said predetermined voltage level to said communication medium and the voltage level of said communication medium at an output thereof;
   c. a third means connected to the output of said first means and the output of said second means for producing an indication signal when the voltage level of said communication medium is approximately equal to said predetermined voltage level.

15. Collision avoidance apparatus as set forth in claim 14 including a counter connected to receive each indication signal from said third means for counting.

16. Collision avoidance apparatus as set forth in claim 15 including a frequency synthesizer connected to receive the count of said counter for varying the frequency of a digital pulse stream, which is produced by said frequency synthesizer, in response thereto.

17. Collision avoidance apparatus as set forth in claim 16 including a fourth means connected to receive said digital pulse stream from said frequency synthesizer for producing a restart signal when a certain number of consecutive pulses of said digital pulse stream are received.

18. A method of avoiding collisions of information transferred on a communication medium comprising the steps of:
   a. applying a predetermined voltage level to said communication medium; and
   b. after step a producing an indication signal if the voltage level of the communication medium is approximately equal to said predetermined voltage level.

19. The method according to claim 18 including the step of counting each indication signal.

20. The method according to claim 19 including the step of varying the frequency of a digital pulse stream in response to the number of indication signals counted.

21. The method according to claim 20 including the step of producing a restart signal after a certain number of consecutive pulses within said digital pulse stream is produced.

* * * * *